United States Patent [19]

Dewing et al.

[11] Patent Number: 4,613,418
[45] Date of Patent: Sep. 23, 1986

[54] ALUMINIUM REDUCTION CELLS

[75] Inventors: Ernest W. Dewing; Adam J. Gesing; David N. Mitchell, all of Kingston; Aniket Pant, Inverary, all of Canada

[73] Assignee: Alcan International Limited, Montreal, Canada

[21] Appl. No.: 675,718

[22] Filed: Nov. 28, 1984

[30] Foreign Application Priority Data

Nov. 29, 1983 [GB] United Kingdom ............... 8331769

[51] Int. Cl.⁴ .......................... C25C 3/08; C25C 3/16
[52] U.S. Cl. ............................... 204/243 R; 204/291
[58] Field of Search ............ 204/67, 243 R, 244–247, 204/291

[56] References Cited

U.S. PATENT DOCUMENTS

| | | |
|---|---|---|
| 3,468,786 | 9/1969 | Day ................................ 204/243 R |
| 3,607,685 | 9/1971 | Johnson ................................ 204/67 |
| 3,723,287 | 3/1973 | Elliot ................................ 204/243 R |
| 4,338,177 | 7/1982 | Withers et al. ................. 204/243 R |
| 4,396,481 | 8/1983 | Pawlek et al. ................... 204/291 X |
| 4,498,966 | 2/1985 | Tabereaux ..................... 204/243 R |

Primary Examiner—Donald R. Valentine
Attorney, Agent, or Firm—Cooper, Dunham, Griffin & Moran

[57] ABSTRACT

An aluminium reduction cell includes a potlining 16, which may be of alumina, with cathode current collectors 24, 32 embedded therein. The cell floor has an array of depressions 22 with at least one collector at the bottom of each depression. The depressions are filled with metal-wettable bodies 20, e.g. 5–20 mm diameter balls of titanium diboride, sized to prevent the entry of electrolyte or sludge. The depressions may be elongate in a direction perpendicular to the horizontal magnetic field in the cell.

11 Claims, 10 Drawing Figures

ALUMINIUM REDUCTION CELLS

BACKGROUND

This invention relates to aluminium reduction cells, and particularly to the problem of cathode current collection therein. These cells are of the kind in which the electrolyte is molten cryolite $Na_3AlF_6$ containing dissolved alumina $Al_2O_3$, and electrolysis is performed between an anode suspended in the electrolyte and a cathode at the floor of the cell. In conventional cells, the floor is of carbon in which are embedded steel members connected to the external electricity supply. The carbon potlining transmits the electric current to the steel connecting members; but carbon is a rather poor electrical conductor, with the result that the cell voltage is higher than would be the case if a better cathode current collector were used.

U.S. Pat. No. 3,093,570 (Dewey) and British 2065174 (Odek) both show cathodes of titanium diboride $TiB_2$ mounted in aluminium slabs for connection to the external electricity supply. $TiB_2$ is a better electrical conductor than carbon; but it is expensive and difficult to form, and has low mechanical strength and a coefficient of thermal expansion very much greater than that of carbon or alumina or other potlining material. For these reasons, solid $TiB_2$ cathodes have not achieved any significant commercial success.

It would be convenient and cheap to use cathode current collectors of aluminium metal. The fact that aluminium melts (660° C.) far below the normal cell operating temperatures (950°–980° C.) means that the high-temperature end of such collectors would be fluid, but that does not in principle make them unsuitable. In practice however, it is found that thermal convection and magnetic effects cause efficient stirring of the molten metal and downward movement of the liquid-solid boundary, to the extent that such collectors cannot be used unless special precautions are taken.

In U.S. Pat. No. 3,607,685 (Johnson) there are described various designs of cathode current collector which are intended to overcome these difficulties. One design comprises an outer refractory tube containing a number of parallel refractory rods or fibres surrounded by molten aluminium; the rods or fibres, which are intended to restrain molten metal circulation, may be made of or coated with a material which is wet by aluminium metal. Another design uses aluminium alloys that have higher melting points and higher viscosities than commercial primary aluminium. Yet another design uses conductor assemblies each comprising a refractory tube and an aluminium core conductor, the high-temperature end of each being positioned at the bottom of a bowl-shaped depression in the cell potlining.

The cell electrolyte is replenished at intervals with alumina. For that purpose the frozen crust is broken at intervals and in the course of such crustbreaking, relatively large lumps of frozen crust, containing a high proportion of alumina, frequently fall into the bath. Because such lumps are of a density close to or even exceeding the density of the product metal they may penetrate the molten metal cathode layer. As the lumps of crust melt they form a sludge layer in the bottom of the cell beneath the molten metal. The sludge is believed to form discontinuous deposits on the cell floor, since the presence of sludge in a conventional cell leads to only a small increase in the cell voltage, although the electrical resistance of the sludge is quite high in relation to the electrical resistance of molten aluminium. It is therefore believed that the passage of the cathode current to the cathodic floor is through molten metal in direct contact with such floor.

In the practical operation of a standard electrolytic reduction cell for the production of aluminium it is found that the sludge content of the cell remains substantially constant and it is believed that the solid alumina in the sludge slowly dissolves in the electrolyte and migrates back to the electrolyte via the surface of the frozen electrolyte, which is present at the cell walls in conventional reduction cells, since the liquid components of the sludge can wet the surface of the frozen electrolyte. As already indicated the presence of sludge in conventional electrolytic reduction cells does not lead to severe operational problems.

However, in some circumstances sludge can cause operational problems. European patent specifications 68782 and 69502 are concerned with two such problems. No. 68782 provides a product metal tapping filter of a material that is wettable by the molten metal in preference to the electrolyte having apertures sized to permit flow of molten metal but to retain molten electrolyte and sludge. No. 69502 provides on the cell floor a monolayer of shapes of a material that is wettable by the molten metal in preference to the electrolyte, apertures in or between the shapes being sized to prevent entry of electrolyte or sludge.

The present invention is concerned with another such problem. When depressions are provided in the potlining, it has been realised that sludge is likely to collect in them. If cathode current collectors are sited at the bottoms of the depressions, it is likely that the collected sludge will rapidly increase the cell resistance. It is an object of the invention to overcome this problem.

THE INVENTION

The present invention provides an aluminium reduction cell including a potlining and embedded therein at least one cathode current collector, the floor of the cell having at least one depression with one end of the cathode current collector positioned therein, the other end of the collector being connected to the external electricity supply, wherein the or each depression is filled with metal-wettable bodies with interstices adapted, when the cell is in operation, to be filled with molten aluminium and of a size to prevent entry of electrolyte or sludge.

The cathode current collector may include, at or near the end positioned in the depression, a regular array or network of solid aluminium-wettable material and an interposed continuous network of at least partly fluid aluminium-containing metal.

Reference is directed to the accompanying drawings, in which:-

each of FIGS. 3 and 4 are vertical sections similar to FIG. 1 but showing different designs of cathode current collector.

Figures 1, 2:
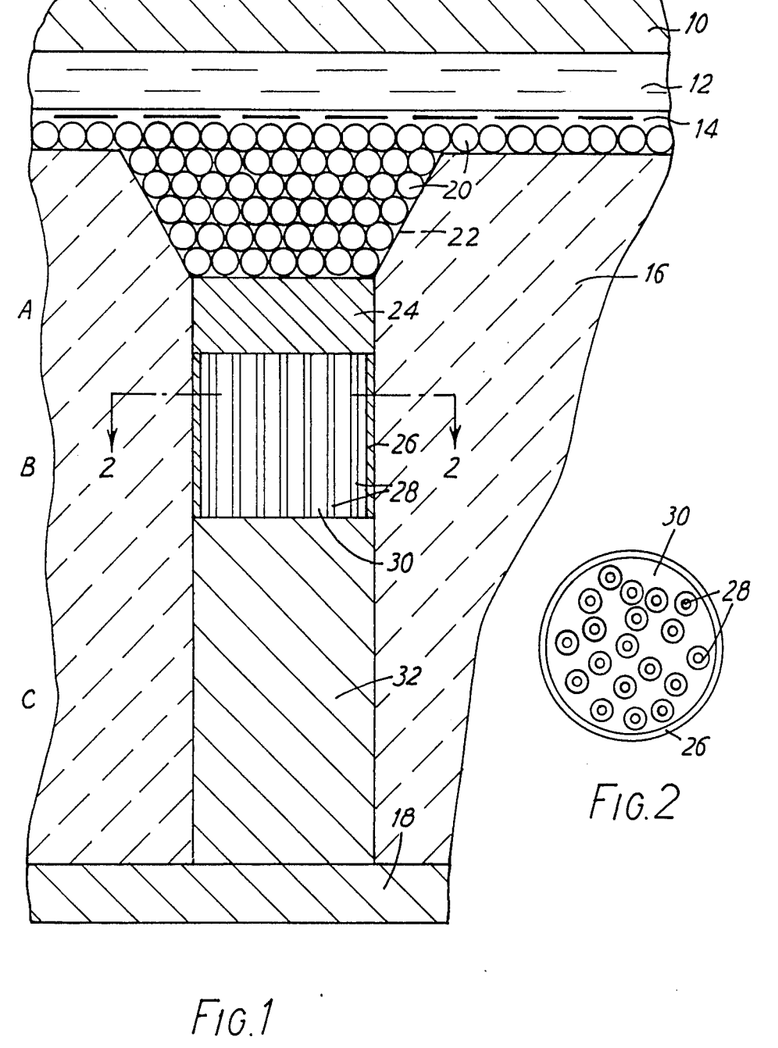
FIG. 1 is a vertical section through part of an aluminium reduction cell including a cathode current collector.
FIG. 2 is a section on the line 2—2 of FIG. 1.

Referring to FIG. 1, an aluminium reduction cell comprises an anode 10, molten cryolite electrolyte 12, a layer of molten aluminium metal 14 constituting the cathode, and cell potlining 16, the whole resting on a thick slab 18 of aluminium metal. The metal pad 14 is shown stabilised by a monolayer of solid metal-wettable spheres 20, e.g. formed or coated with TiB$_2$.

A depression 22 formed in the cell potlining is filled with the solid spheres. The top end A of a cathode current collector is positioned at the bottom of this depression and consists of a solid block or cap 24 of an electrically conducting material resistant to attack by molten aluminium, for example TiB$_2$.

The next lower section B of the collector includes a large diameter refractory tube 26 containing an array of parallel small diameter tubes 28, the space 30 within and between the tubes being filled with aluminium-containing metal. Towards the top end of this section the metal will, by virtue of the high operating temperature of the cell, be at least partly fluid. Towards the lower end of the section however, the metal should be solid.

The next lower section C of the collector is a bar 32 of aluminium metal which is electrically connected at its upper end to section B and at its lower end to the aluminium slab 18 which constitutes the floor of the cell.

Figure 3:
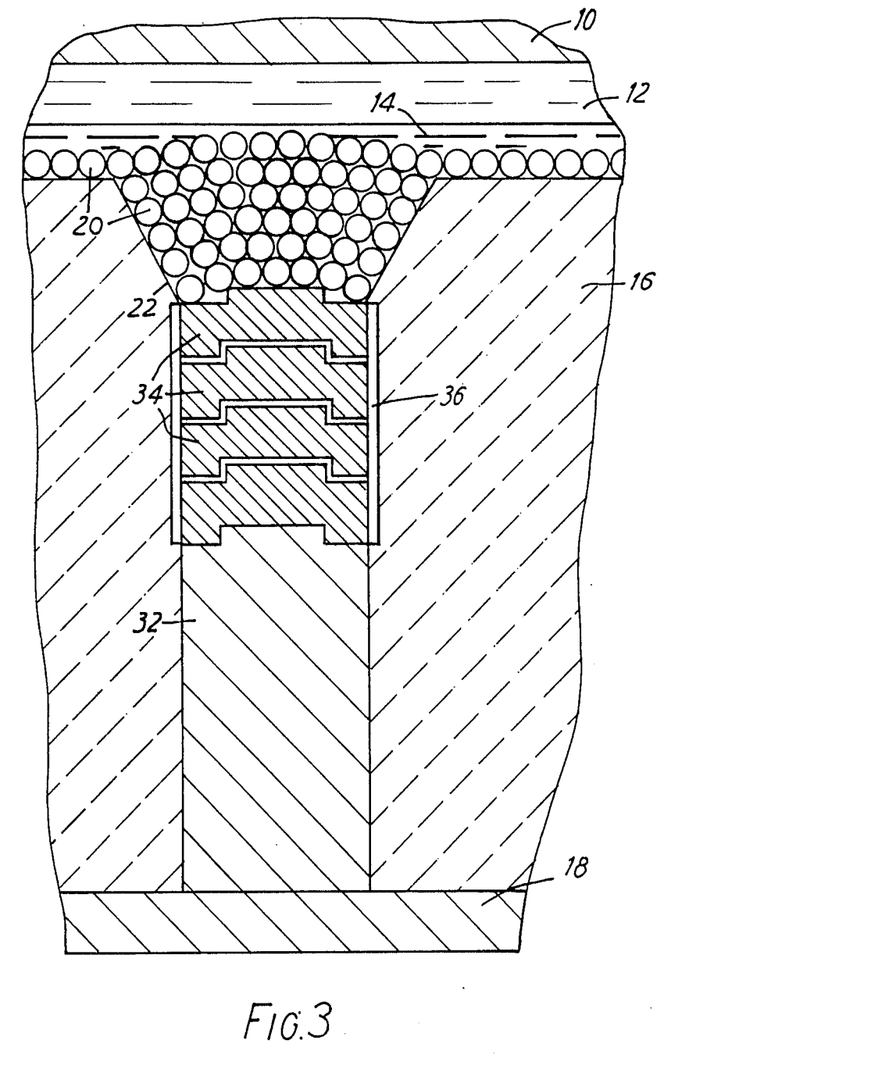

In FIG. 3, like parts are numbered as in FIG. 1. The upper section of a collector bar consists of a series of superimposed plates 34 formed of a TiB$_2$/Al composite material, within a tube 36 of Al$_2$O$_3$. The individual plates can be made by hot pressing. The stack of discs can be cast within the Al$_2$O$_3$ tube in aluminium metal to provide the electrical connection.

Figure 4:
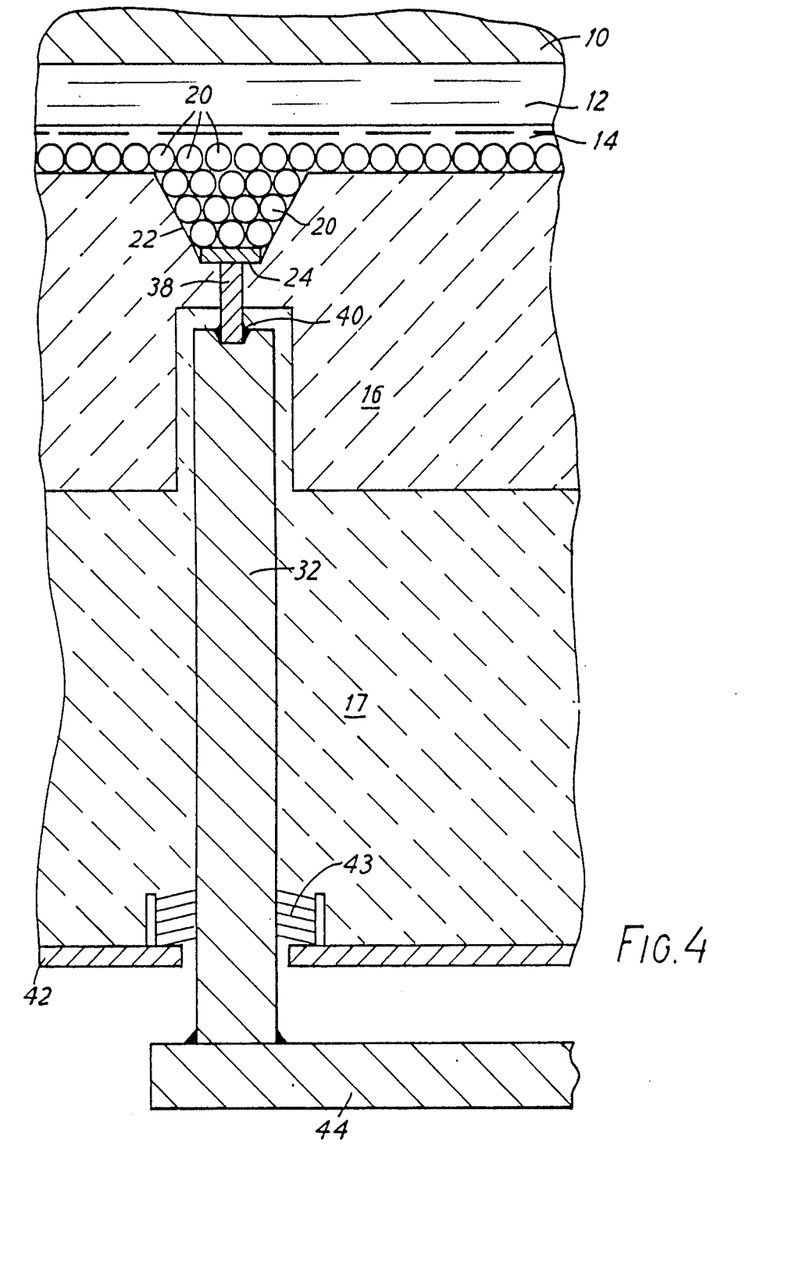

In FIG. 4, like parts are numbered as in FIGS. 1 and 3. The cell is shown as having a molten metal pad 14 stabilised with metal-wetted packing 20, but it should be understood that the molten metal pad does not need to be stabilised. The depression 22 is filled with metal-wetted packing 20 with molten metal in the interstices, and the interstices should be of such a size that electrolyte sludge is prevented from entering.

The top end of the cathode current collector is positioned at the bottom of the depression and consists of a solid block or cap 24 of titanium diboride. The next lower section of the collector is a bar 38 of TiB$_2$ or a TiB$_2$/Al composite which extends between the 950° C. and 500° C. isotherms. The exterior of the bar is painted with a carbonaceous compound to render it non-wetted by metal and to prevent penetration of molten metal down the collector bar.

The lower end of the bar 38 is welded at 40 to a solid aluminium metal rod 32. The cell is shown as having a steel shell 42, and the rod 32 extends through the shell to an aluminium busbar 44 via an air seal 43 of an alumina castable compound or refractory fibre rope. The rod 32 and the busbar 44 are sized to withdraw sufficient heat from the collector structure to maintain the joint 40 at 500° C. The potlining is shown in two layers, an inner layer 16 of tabular alumina aggregate and an outer layer 17 of metallurgical grade alumina powder.

Figure 5:
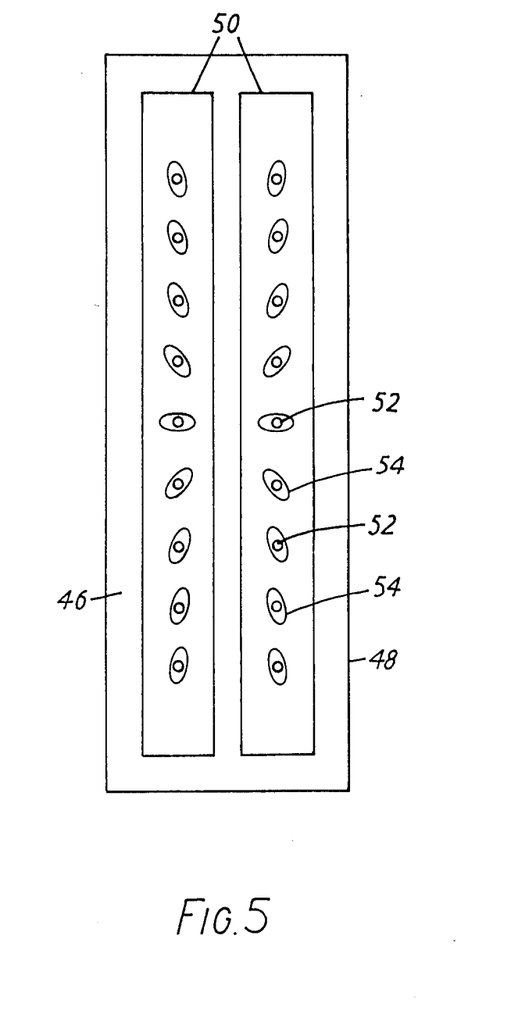
FIG. 5 is a plan view of a cell floor showing an arrangement of elongated depressions.

FIG. 5 is a diagrammatic plan view of an aluminium reduction cell floor 46 surrounded by a cell wall 48. Two rows of anodes (not shown) overlie the floor, casting anode shadows represented by the rectangles 50. The floor has two rows of nine cathode current collectors 52, the rows extending below the anode shadows. Each collector is positioned at the bottom of a depression 54 which is not circular but rather elliptical. It is known that the horizontal component of the magnetic field in a cell of the design follows a generally elliptical path, and the major axes of the elliptical depressions 54 are arranged at right angles to this, for reasons to be discussed below.

Figure 6:
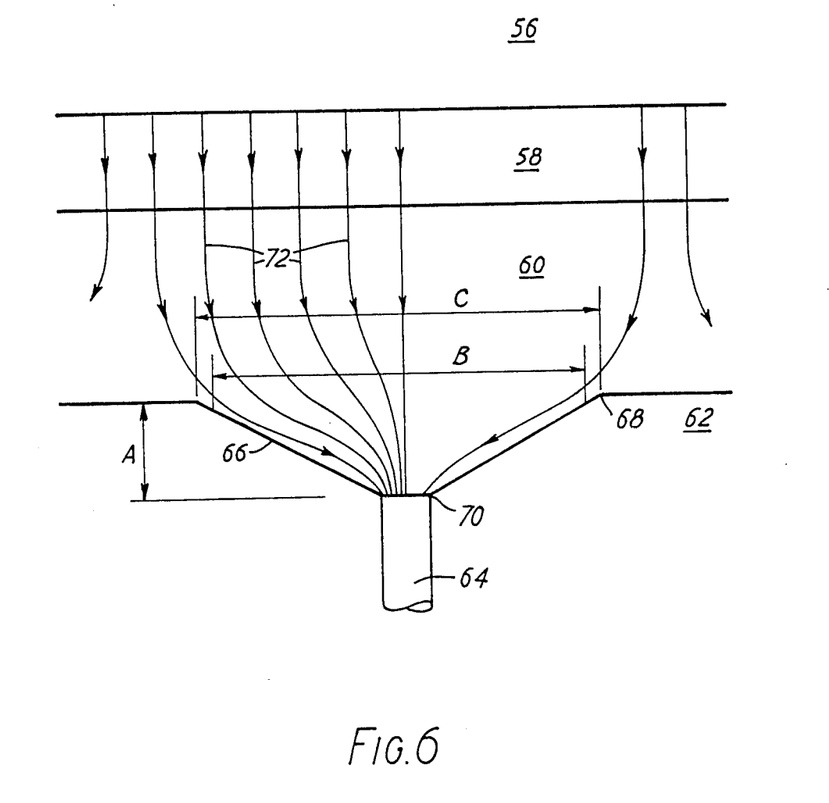
FIG. 6 is a vertical section through the cell floor including a depression and the top end of a cathode current collector.

FIG. 6 is a vertical section through part of an aluminium reduction cell including part of an anode 56, an electrolyte bath 58, a molten metal pad 60, a cell floor 62 and a cathode current collector 64. A circular depression in the cell floor is defined by sloping walls 66 which meet the top surface of the cell floor at 68 and the collector at 70. Lines 72 with arrows show the lines of flow of electric current from the anode to the cathode current collector. The depression has a depth A and a diameter C. The dimension B represents the spread of electric current at the level of the cell floor if the depression does not constrict the current (i.e. if C is equal to or greater than B). Preferred values of the dimensions A and C are discussed below. In this figure, the metal-wettable bodies have been omitted in order to show the lines of flow of electric current more clearly.

Figure 7:
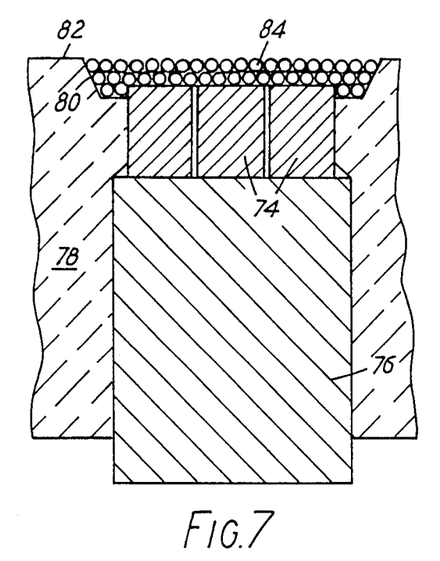
FIGS. 7 and 9 are side views, and FIGS. 8 and 10 respectively are end views, of two different forms of cathode current collector.
Figure 8:
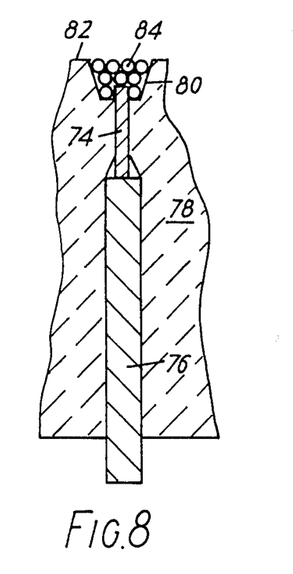

FIGS. 7 and 8 are respectively side and end views of a cathode current collector which comprises a row of three rectangular blocks 74 of ceramic material joined at their lower ends to a single rectangular slab 76 of aluminium metal. The collector is built into the floor 78 of a cell having an elongated depression 80 in its surface 82 which depression is filled with metal-wettable bodies 84. The upper ends of the three blocks 74 stand proud of the floor of the depression but below the surface 82 of the cell floor, and are covered by at least one layer of the bodies 84.

Figure 9:
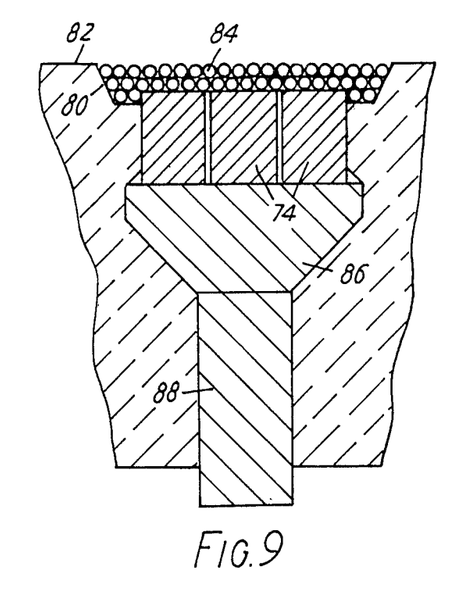
Figure 10:
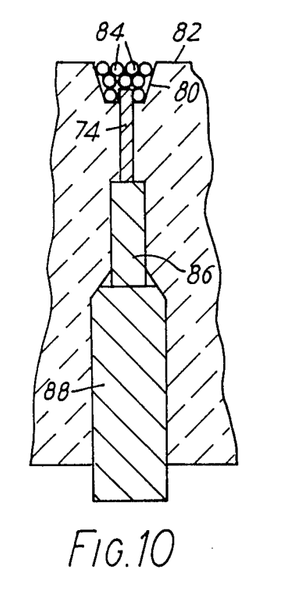

FIGS. 9 and 10 are similar. Three rectangular blocks 74 of ceramic material are joined at their lower ends to a section 86 which tapers in a downward direction and is joined at its lower end to an aluminium bar 88 of circular cross-section. The section 86 is formed of an array or network of solid aluminium-wettable material and an interposed continuous network of at least partly fluid aluminium-containing metal.

Numerous changes are possible in the designs illustrated, as described below.

DETAILED DESCRIPTION

In the aluminium reduction cells of this invention, the nature of the anode and the electrolyte and the cathode are not critical and may be as in conventional cells. In particular, the cathode may be constituted by a pool of molten metal overlying the floor of the cell. It is known that magnetohydrodynamic disturbances can cause swirling of metal and wave formation, and that this can be damped down by means of baffles or solid objects in the metal pool. Alternatively, the cathode can be raised above the level of the molten metal/electrolyte interface. Alternatively, the cell can be operated in a drained configuration with a solid cathode, the molten metal as it is formed being caused to flow to a trough for tapping.

It is an advantage of the cathode current collectors of this invention that they permit the use of electrically non-conducting cell lining materials such as alumina. Thus, most of the cell cavity can be filled with powdered Al$_2$O$_3$, packed as well as possible, at least one layer of dense, tabular Al$_2$O$_3$ aggregate or bricks being provided on the top surface. With conventional carbon cell linings it may also be advantageous to use the cathode current collectors of this invention, rather than rely on the rather poor electrical conductivity of carbon.

The top end of the current collector is situated in a depression in the potlining. This has two advantages; the collector is protected from physical shock; and the length (and hence cost) of that portion of the collector which has to operate at temperatures above 500° C. is reduced. The depression may be of circular shape. Or the depression may be elongate in a direction at right angles to the magnetic field in the molten metal, so as to form a trough. Each trough may have one or several current collectors within it. Since the horizontal component of the magnetic field in a commercial cell follows a generally elliptical path in the molten metal round a vertical axis through the centre of the cell, one or more troughs may extend in the potlining in a generally radial direction from that vertical axis. The troughs may be curved so as to be perpendicular to the horizontal magnetic field; and approximately equally spaced, which implies troughs of different lengths with some terminating earlier than others as they converge from the side wall towards the vertical axis of the cell.

Electric current flows vertically down from the anode to the cathode surface, and then takes the shortest route towards a nearest trough. If the troughs are arranged with their long axis perpendicular to the horizontal component of the magnetic field, the current path is then approximately parallel to the magnetic field lines. Since the magnitude of the magnetic force is proportional to the cross product between the current and magnetic field vectors, this force is minimized by such current collector arrangement. To ensure good electrical contact between the cathode and the cathode current collector, the troughs should be filled with molten aluminium. With a cell operated in the drained configuration, the troughs may serve the additional purpose of collecting product metal for tapping.

Alternatively, the depressions may be of elliptical shape each containing a single cathode current collector, along the lines shown in FIG. 5. Elliptical-shaped depressions cannot, of course, be used to collect product metal for tapping; but they have a different advantage over longer troughs containing several collectors. Depressions filled with metal-wettable bodies are expensive compared to ordinary cell lining and it is desired to minimise the volumes of the depressions. A set of elliptical depressions is, in aggregate, smaller than an array of troughs but is nevertheless quite effective to reduce magnetic forces in the cell.

The collector bars may be distributed uniformly under the anode shadow or may be offset somewhat to counteract any magnetic field imbalance. The number of collector bars depends on the current loading of each. This will usually be in the range 1–10 KA, preferably 3–6 KA, per collector. The optimum number of collector bars depends on magnetic effects, economics, and, in the case of a retrofit, the existing busbar layout. Thus the minimum current carried is limited by economics, i.e. cost of multiplicity of small busbars, and their mechanical integrity. The maximum current carried is limited by local magnetohydrodynamic effects.

For example, a 175 KA cell may have two rows of 18 collector bars each carrying 4.9 KA, in trenches aligned as shown in FIG. 5. For 22m$^2$ of total anode area, there would be 0.6m$^2$ per collector bar. This assumes an anode current density of 0.8 KA/m$^2$.

Insofar as the presence of bottom entry collectors causes humps in the metal surface due to magnetic effects, it may be desirable to locate the collectors in such a way that the humps in the metal lie beneath the gaps between the anodes of a prebake cell. Such humps would then tend to make anode faces convex rather than concave in the middle, thereby promoting gas release rather than gas entrapment.

In order to minimise humping of the molten metal surface due to magnetic effects, it may be desirable to keep down the horizontal current density in open metal above a depression. This may be achieved by careful design of the depression. As shown in FIG. 6, the depth A of the depression should be sufficiently large for the spread of electric current at the level of the cell floor (as indicated by the dimension B) to bring the horizontal current density down to a safe level of not more than about 10$^5$ A/m$^2$, preferably not more than $3 \times 10^4$ A/m$^2$. On the other hand the depth A should be no more than is necessary to achieve this object. Generally, A will be less than 200 mm, preferably from 30 mm to 100 mm.

Ideally, the diameter C of the depression should be not less than B, but this may not be practicable in view of the large number of depressions that may be needed. It is unlikely that depressions with diameters greater than about 1m would be useful. Generally, the ratio of C:A will be at least 2, preferably from 4 to 8. When the depression is not circular, and has not one diameter but a range of cross-sections measurable in various directions, the ratio of minimum cross-section to depth will be, as for circular depressions, generally at least 2 and preferably from 4 to 8.

Improved designs are possible if the top end of the collector 64 projects above the bottom 70 of the depression. This forces the current to enter the top of the collector radially as well as axially, and minimises interaction with the magnetic field created by the collector itself. At least one layer of metal-wettable shapes should overlie the top of the collector; this consideration determines the maximum height of the projecting portion.

Two designs of cathode current collector in which the top end 74 of the collector projects into the depression 80 in the cell floor 82 are shown in FIGS. 7 to 10. These figures also illustrate the concept that the collector can be elongated in cross-section, either at its upper end or over its entire length. In fact the cross-sectional shape of the collector is not critical and may be determined by what is easiest and cheapest to manufacture.

By way of example, we can report calculations on the horizontal current densities associated with four different circular depression geometries (i), (ii), (iii) and (iv); results for the two depressions of infinite diameter are given for comparison.

|  | (i) | (ii) | (iii) | (iv) |
| --- | --- | --- | --- | --- |
| Depression depth (dimension A) (mm) | 100 | 100 | 65 | 65 |
| Height of collector top above depression bottom (mm) | 35 | 35 | 52 | 52 |
| Diameter of collector bar (mm) | 50 | 50 | 50 | 50 |
| Depression diameter (dimension C) (mm) | Inf. | 280 | Inf. | 280 |
| Total collector bar current (A × 10$^{-3}$) | 4.9 | 4.9 | 4.9 | 4.9 |
| Max. horizontal current density at metal surface | 2.3 | 4.8 | 4.6 | 5.7 |

| -continued | | | | |
|---|---|---|---|---|
| | (i) | (ii) | (iii) | (iv) |
| (A/m² × 10⁻⁴) | | | | |

The depressions or troughs are filled with solid bodies, the molten metal occupying the interstices between them. The solid bodies must be of a material which is more dense than, and is not attacked by, molten metal and electrolyte under cell operating conditions. They may be uniform or non-uniform in size and regularly or irregularly shaped. The solid bodies serve the dual purpose of stopping the depressions from caving in before or during start-up, and of damping down metal flow during operation.

Since the solid bodies are made of, or coated with, a material such as $TiB_2$ which is preferentially wetted by metal in the presence of electrolyte, they serve an additional function. In commercial operation, some alumina inevitably falls into the molten metal pad and forms a sludge on the floor of the cell. As sludge ages in the cell it recrystallises, growing alumina crystals. This reduces the interstitial volume available for electrolyte within the sludge, and the liquid electrolyte is expelled on to the surface of the sludge. This sludge is gradually dissipated and does not normally cause a problem. But if sludge or electrolyte associated with it were to gather in the depressions or trenches here described, it might interfere with the electrical connection between the molten metal in the depression or trench and the cathode current collector at the bottom. Metal-wettable solid bodies of suitable size can operate by surface tension effects, as described in our European Patent Specification 68782, to prevent the entry of electrolyte or sludge into the depressions, thus completely overcoming the problem.

The minimum cross-sectional dimension of the interstices is an important factor in determining whether electrolyte or sludge can enter the interstices or not. Obviously the interstices in between shapes can be of very complex configuration in which case precise calculations are impossible. Nonetheless, it is usually possible to make some estimate of the acceptable size of shapes by approximating the most constricted portion of the interstices by a cylinder of diameter w. Permissible values for w can be determined from the formula $$w < \frac{4\gamma}{(\Delta\rho \cdot g \cdot h)}$$

where $\gamma$ is the interfacial tension at the metal/electrolyte interface, approximately 550 dyne/cm.

$\Delta\sigma$ is the density difference between Al and sludge, approximately $0.7 g/cm^3$ g is the acceleration due to gravity, 980 cm/s² h is the maximum depth of the sludge layer

For a typical value of h=5cm $$w < \frac{4 \times 550}{980 \times 0.7 \times 5} = 0.6 \text{ cm approx.}$$

In the case where the metal-wettable bodies are balls, diameters of from 0.5cm to 3cm are preferred. Calculation shows that the diameter of spheres in a packed layer having an interstice "diameter" of 0.6cm is about 4cm and this represents an upper limit to what would be acceptable if sludge layers as thick as 5cm are anticipated. The lower size limit is determined by the possibility of entrainment of the bodies by the MHD driven metal circulation.

Balls are one possible shape. Other shapes however having somewhat different dimensional ranges can be used to obtain the same interstitial spacings, e.g. the shapes can be elongated and positioned vertically.

The top end of the cathode current collector (section A in FIG. 1) may be constituted by a solid block or cap of an electrically conducting refractory material resistant to attack by molten aluminium. One suitable material is $TiB_2$; another is a $TiB_2/Al$ composite containing a sufficiently low proportion of Al to remain solid under the prevailing conditions.

The structure of the upper (hot) end of the cathode current collector forms the subect of copending U.S. Pat. Application No. of E. W. Dewing et al. 675,732 filed November 28, 1984.

The lower end of the collector is a solid conductor, generally a metal bar which may be of copper or steel but is preferably of aluminium. The top (hot) end of this bar may be connected to the bottom (cool) end of the section which includes a regular array or network of solid aluminium-wettable material. When the section is formed by casting aluminium round the solid material, it may be convenient to cast at the same time a unitary aluminium bar, which can then serve as the lower end of the collector. Alternatively, the two sections can be connected by welding.

In a preferred embodiment, the metal bar is secured at its lower end to a slab of aluminium of sufficient thickness to support the cell.

This slab forms the base of the cell, and may have fins for air cooling or other means for forced cooling to control the cell temperature. The slab acts as a bus bar and is electrically connected to the anode of the next cell in series. When the floor of the cell is of aluminium, the outer walls may be of aluminium or steel. Alternatively, the whole shell of the cell may be of steel, and the lower end of the current collector may be bolted to the shell or may extend through the shell for connection to the bus bar system.

This specification has referred to the top (hot) end and the bottom (cool) end of the cathode current collector as though this was vertical. In fact, the collector may be vertical, or it may be horizontal and extend through the side wall of the cell; or a vertical hot end may be joined to a horizontal metal bar. It is generally preferred that the hot end of the collector extend vertically down from the cell, as this reduces horizontal electrical currents and magentic fields and reduces magnetohydrodynamic disturbances in the metal pad.

There is necessarily a temperature gradient along the cathode current collector, from about 950° C. at the hot end to perhaps 200° C. at the cool end. The number of collectors per cell, and the length and diameter of each section of each collector need to be designed in conjunction with the dimensions of any depressions in the cell potlinings, in accordance with known criteria, to achieve a desired combination of electrical conductivity and heat loss at minimum capital cost. Since $TiB_2$ is a relatively expensive material, it may be desired to reduce the length of sections containing it. But if the metal bar at the lower end is of aluminium, it must not be exposed to temperatures at which it loses mechanical strength, so the junction between the section including the array or network and the metal bar should not exceed 500° C. In order to improve heat control, the cross-section area of the metal bar may increase from this junction downwards.

We claim:

1. An aluminium reduction cell including a potlining and embedded therein at least one cathode current collector, the floor of the cell having at least one depression with one end of the cathode current collector positioned therein, the other end of the collector being connected to the external electricity supply, wherein the or each depression is filled with metal-wettable bodies with interstices adapted, when the cell is in operation, to be filled with molten aluminium and of a size to prevent entry of electrolyte or sludge.

2. A cell as claimed in claim 1, wherein the or each depression in the floor of the cell is elongate in the form of a trough.

3. A cell as claimed in claim 2, wherein the or each trough extends in a generally radial direction from a vertical axis through the centre of the cell and perpendicular to the horizontal magnetic field in the cell.

4. A cell as claimed in claim 1, wherein the or each depression in the floor of the cell is elongate in a direction perpendicular to the horizontal magnetic field in the cell and has one cathode current collector positioned therein.

5. A cell as claimed in claim 1, wherein the top end of the cathode current collector stands proud of the bottom of the depression in which it is positioned but lower than the surrounding cell floor and is covered by at least one layer of the metal-wettable bodies.

6. A cell as claimed in claim 1, wherein a plurality of cathode current collectors is arranged in depressions distributed over the floor of the cell such that, in operation, the current loading on each collector is from 1–10 KA.

7. A cell as claimed in claim 1, wherein the metal-wettable bodies are balls having diameters of from 5–20 mm.

8. A cell as claimed in claim 1, wherein the metal-wettable bodies are of titanium diboride.

9. A cell as claimed in claim 1, wherein the cell floor is formed of electrically nonconducting material.

10. A cell as claimed in claim 1, wherein the or each depression in the cell floor has a depth of up to 200 mm and a cross-section at its outer end of at least twice its depth.

11. A cell as claimed in claim 10, wherein the or each depression in the cell floor has a depth of 30 to 100 mm and a cross-section at its outer end of at least twice its depth.

* * * * *